United States Patent

Grover

[15] 3,693,804
[45] Sept. 26, 1972

[54] PRESSURE DIFFERENTIAL FILTERING APPARATUS AND METHOD

[72] Inventor: Douglas U. Grover, 2910 Jerome Road, Fulton, Ga. 30337

[22] Filed: April 29, 1971

[21] Appl. No.: 138,571

Related U.S. Application Data

[63] Continuation-in-part of Ser. No. 865,588, Oct. 13, 1969, abandoned.

[52] U.S. Cl..................................210/359, 210/446
[51] Int. Cl. ...............................................B01d 33/00
[58] Field of Search.........210/77, 359, 361, 369, 446

[56] References Cited

UNITED STATES PATENTS 3,481,477  12/1969  Farr..........................210/359

Primary Examiner—John Adee
Attorney—Douglas M. Clarkson

[57] ABSTRACT

Pressure differential sampling and filtering apparatus and method of use. The apparatus includes a tubular sampling member open at both ends, one end having a resilient piston with a flexible lip which engages and wipes the inside surface of a test tube during insertion and withdrawal. The piston has an open bore containing a filter which has a porous structure with open cells forming a plurality of fluid flow channels. Filtrate emanating from the filter flow channels enters directly into the interior of the sampling member, thereby minimizing plugging.

9 Claims, 4 Drawing Figures

PATENTED SEP 26 1972 3,693,804

INVENTOR.
DOUGLAS U. GROVER
BY Douglas M. Clarkson
ATTORNEY

PRESSURE DIFFERENTIAL FILTERING APPARATUS AND METHOD

CROSS-REFERENCE TO RELATED APPLICATION

This application is a continuation-in-part of U.S. application, Ser. No. 865,588, filed Oct. 13, 1969, entitled "Method and Apparatus for Withdrawing a Filtering Sample", now abandoned.

BACKGROUND OF THE INVENTION

This invention is concerned with a device for the filtration and separation of liquid mixtures that have been stratified, or contain precipitates or the like. Such a device is particularly useful in the analysis of blood samples wherein it is necessary to separate the blood cells from the serum. U.S. Pat. Nos. 3,355,098 and 3,481,477 issued to Farr and U.S. Pat. No. 3,512,940 issued to Shapiro disclose apparatus which exemplifies the prior art.

U.S. Pat. No. 3,481,477 to Farr discloses a device designed to both filter and sample blood contained in a test tube. FIG. 8 of Farr discloses an embodiment wherein the filter member is situated within the piston head of the sampler. However, because the filtrate issuing forth from the filter member does not enter directly into the interior of the sampler, but rather is restricted in its flow area, this device is quite susceptible to plugging by particulate masses, especially by the fibrine contained in blood. The long flexible capillary tube of the Farr device is also subject to plugging. Furthermore, the Farr device is not reversible in the sense that the filtrate cannot readily be re-combined with the unfiltered portion of the sample.

U.S. Pat. No. 3,512,940 to Shapiro discloses a tubular sampler having a filter body mounted on one end and having a plurality of spaced O-rings which form a seal between the tubular member and the inner test tube wall. The major objections to the Shapiro device are the difficulties and relatively high cost associated with its manufacture. Furthermore, devices as described in the Shapiro patent, have proven to be quite difficult to manipulate due to the close tolerances and nature of the O-ring seals.

The present invention overcomes the difficulties associated with the prior art devices described above.

SUMMARY

The present invention is directed to a device which serves both to filter and to separate one of several stratified immiscible liquids. The device also has utility in the filtration and separation of liquids containing precipitates or particulate solids. The device includes an elongated tubular sampling member having a hollow interior open at both ends and a resilient piston member mounted on one end. The piston member is mounted by the insertion of one end into the elongated sampling member and is held there by frictional force. The body of the resilient piston member has a central, axial bore open at both ends and a concentrically disposed flexible lip integral with and projecting outwardly from the body of the piston member. The flexible lip is situated at the free end of the piston body outside of, and adjacent to, one end of the elongated tubular member. The cross-sectional area of the piston member, taken through the lip is slightly larger than the mouth of said container so that the lip engages and wipes the inside surface of the test tube or other container during insertion and withdrawal. The engagement between the piston lip and the inner wall of the container allows pressure to be formed in the sample space by insertion of the elongated tubular member and a vacuum to be formed by its withdrawal.

The elongated member has a cross-sectional area smaller than the mouth of the test tube or other container with which it is to be used. The elongated member serves as a sampling device having a hollow interior to receive and temporarily retain the filtrate. The interior of the elongated member is open at both ends and is in direct communication with the filter member so that the filtrate enters directly into the sampler without any restriction of the flow area.

Accordingly, it is an object of the present invention to provide a device which serves both to filter and to separate a liquid sample.

It is a further object of this invention to provide such a device highly resistant to plugging by liquids containing particulate masses, especially by the fibrine contained in blood.

It is another object of this invention to provide such a device having a flow channel of relatively large area between the filter member and the interior of the sampler so as to provide direct communication therewith.

It is yet another object of this invention to provide a device operable with a minimum of difficulty in keeping with the other stated objects.

DESCRIPTION OF THE PREFERRED EMBODIMENTS

Figure 1:
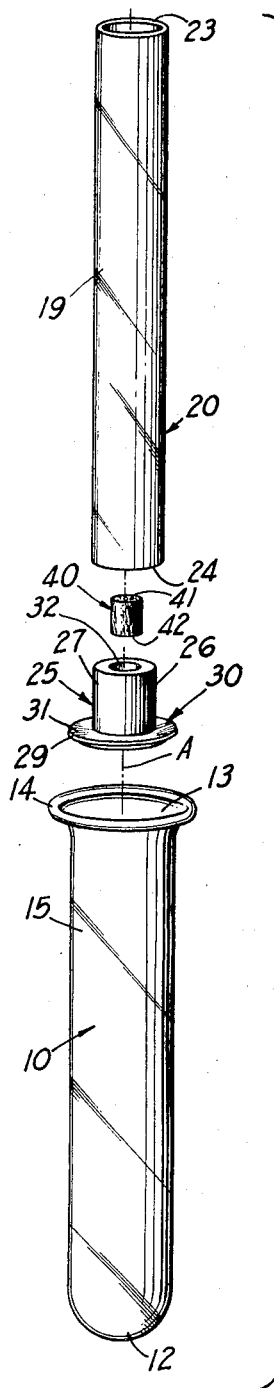
FIG. 1 is an exploded perspective view of a pressure differential filtering apparatus constructed in accordance with the present invention.

Referring now in detail to the embodiment chosen for the purpose of illustrating the present invention, numeral 10 denotes generally a container or test tube which is transparent, being formed of glass or plastic or the like. The test tube 10 is conventional in that it has a hollow cylindrical body 11 which is closed at its bottom portion by hemispherical or concaved bottom 12. The mouth 13 of the container 10 may optionally have an outwardly flared rim 14. The container's outside cylindrical wall is shown at 15 and its inside cylindrical wall at 16.

The container 10 is an integral member which is symmetrical, the outside wall 15 being concentric with the inside wall 16 along vertical axis denoted by A in FIG. 1.

The sampling member denoted generally by numeral 20 is a hollow tubular cylinder which has a smooth cylindrical outside wall 19 and a smooth cylindrical inside wall 22 disposed concentrically along a vertical axis A as illustrated in FIG. 1. The chamber of the sampling member is defined by the inside wall 22 and is cylindrical throughout its length, being open at the outer end 23 of the sampler 20 and also open at the lower end 24 of the sampler 20.

It is contemplated that the elongated sampling member may be of any cross-sectional shape, but since the preferred container is a standard test tube, the preferred cross-sectional shape for the sampling member is circular. The sampling member is longer than the test tube so that one end protrudes from the top of the test tube when inserted to the bottom. The outside diameter of wall 19 of sampler 20 is smaller than the inside diameter of wall or surface 16 of container 10.

Figure 2:
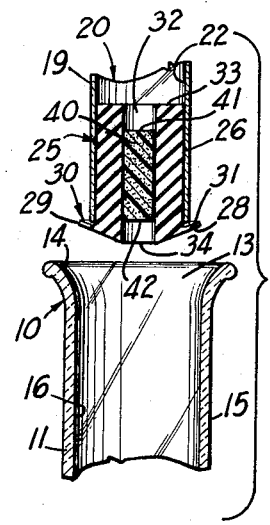
FIG. 2 is an enlarged fragmentary vertical sectional view of the lower end portion of the tubular sampling member and the upper end portion of the container of the device illustrated in FIG. 1.

The piston 25 is formed from rubber, neoprene, or some other resilient or flexible material. The piston includes a body 26 having a cylindrical outside surface 27 which is of slightly larger diameter than the diameter of the inside wall 22 of the sampling member 20. The body 26, at its lower end portion is provided with a flexible annular radially extending lip or flange 30 having a rounded rim 29. The piston body has a frusto-conical bottom surface 28. From rim 29, the bottom surface 28 tapers radially inwardly to a junction with the outer surface 27. By such an arrangement, the annular flange or lip 30 is provided with an upper radial shoulder 31 for abutting the lower end portion 24 of the sampler 20 when the piston 25 is inserted into the end 24 of the sampler, as illustrated in FIG. 2. The diameter of rim 29 of the lip 30 is slightly larger than the diameter of surface 16 and larger than the diameter of wall 19. For better sealing, additional lips or flanges, similar to lip 30, may be provided on the piston body.

The piston 25 is provided with an axial bore 32 which, as illustrated in the drawings, has a uniform diameter throughout its length. The bore may be modified to better hold the filter member by making it of a non-uniform diameter, e.g., sloped or stepped. The bore 32 is open both to the interior of sampler 20 at the upper end 33 and to container 10 at the lower end 34. The bore 32 is concentric with both the outside surface 27 of the piston 25 and with the rim 29 of lip or flange 30. Within the bore 32 is an elongated, cylindrical, porous, plastic filter 40 which has a plurality of interconnected voids defining passageways or channels through the plastic material. With the filter 40 within the bore 32, the passageways formed by the interconnected voids communicate directly with the hollow interior of the sampling member and provide a flow path for the filtrate from the vicinity of the bottom opening 34 of bore 32 upwardly through filter 40 and directly into the interior of sampler 20. In addition to being formed of a solid porous plastic material, the filter 40 may also be formed of glass-wool, asbestos, synthetic plastic fibers and porous ceramic or other inert inorganic filtering materials such as sintered glass and diatomaceous silica. The filter 40 is press fitted into the bore 32 and is frictionally held in place thereby, the upper end 41 of the filter terminating inwardly of the upper end 33 of the piston 25. Also, the lower end 42 of the filter 40 terminates inwardly of the lower end 34 of piston 25. Instead of the unitary filter member depicted in the drawings, the filter member may be composed of two or more layers of differing porosity. The filter member may also be of a non-uniform diameter to increase the frictional forces holding it within the piston bore.

From the foregoing description, the operation of the foregoing present device should be apparent. When the upper portion of a liquid is to be separated from the remainder of the liquid or solid, the liquid is placed in the container 10. Such operations as centrifuging, precipating, or other reactions can be carried out in the container, if desired. Thereafter, the sampling member 20 is inserted with the piston 25 first, into the mouth 13 of container 10. The sampler 20 is then manually urged inwardly so that the rim 29 of the lip 30 circumferentially engages the inside wall 16 of container 10. As pointed out above, the lip or flange 30 is of larger diameter than the inside diameter of the container 10 and, hence, so long as the sampler 20 is not urged to one side or the other, the rim 29 will continue to engage the inside wall 16, and be retained snugly by the container 10. As the sampler is urged inwardly, the lip or flange 30 will wipe along the inside wall 16, thereby confining and forcing the fluid (both liquid and gas) into and through the filter 40. As soon as the level of liquid in the container is reached, the liquid will be progressively urged from the vicinity of the bottom opening 34 of bore 32 upwardly through filter 40 and directly into the interior of the sampling member 20. Further urging inwardly of sampler 20 will cause still additional liquid to be collected from the uppermost portion of the liquid in container 10 through filter 40 and into the interior of sampler 20.

The positions of the various parts of the present device, as the sampling member 20 is inserted into the mouth 13, are illustrated in FIG. 2. The emanation of the liquid through the filter 40 into the interior of the sampler 20 is illustrated in FIG. 3.

Figure 3:
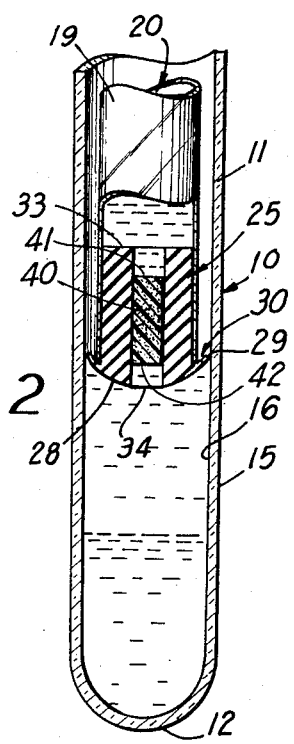
FIG. 3 is an enlarged vertical sectional view of the lower portion of the container and a fragmentary partially broken away view of the sampling member being inserted into the container, the container being partially filled with a liquid which is to be sampled.

The sampler is left in the position shown in FIG. 3 and portions of the filtrate removed therefrom by a pipette (not shown), by pouring, or by other suitable means. The filtrate to be saved is poured into another container. Alternately, the unused portion of the filtrate may be recombined with the unfiltered portion of the sample by the simple expedient of pulling the sampling member telescopically out in the direction of the axis A, which movement will cause a vacuum to be formed below the lip 30 and result in back-filtration.

Figure 4:
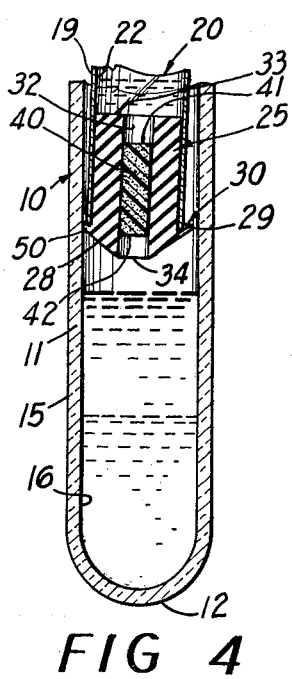
FIG. 4 is a fragmentary vertical sectional view of the lower end portion of the container and the sampling member, the sampling member being urged sidewise so as to compress a portion of the lip of the piston member so as to permit axial movement of the sampling member without creating an appreciable pressure differential.

Alternately, the sampler with the filtrate contained therein may be removed from the test tube. In this alternative method, the circumferential engagement between the piston lip and the inner surface of the container is broken. To accomplish this breaking, the sampling member 20 is either tilted in the container 10, as illustrated in FIG. 4, or is urged to one side, so as to compress a part of the lip 50 against the inside wall 16 of container 10. When the lip 30 has a width between one-sixteenth inch and three-sixteenths inch, a portion of the lip, on a side opposite the compressed portion 50, will be spaced from the inside wall 16 to form a gap as illustrated in FIG. 4. With a gap between a portion of the lip and the inside wall formed in that manner, the sampling member may be removed from the container with the filtrate retained in its interior. The gap permits the free passage of air and thereby avoids the formation of a vacuum during withdrawal. The filtrate sample may then be transferred from the sampler by pouring or by other suitable means.

The apparatus of this invention may also be employed as a suction filter device. Thus, the tubular member 20 may be inserted to the bottom of the container 10, and the liquid to be filtered poured into the interior of the tubular member 20. Pulling, to move the member 20 telescopically out of the container 10, will cause a vacuum to form in the bottom portion of the container below the lip 30. That vacuum will induce filtration through the porous plastic filter member 40. In this manner, a lower (heavier) liquid layer may be filtered and sampled.

While the above description is limited to specific embodiments of the apparatus and method, it is understood that various modifications within the spirit of the invention may occur to those skilled in the art. Therefore, it is intended that no limitations be placed on the invention except as defined by the scope of the appended claims.

I claim:

1. A pressure differential filtering apparatus comprising:
   an elongated sampling member defining a central passageway a portion of which collects liquid, said central passageway being open at both ends and extending through the entire length of said sampling member with one end portion of said sampling member having a resilient lip projecting radially to form a piston, said lip being capable of forming a seal with the walls of a container which contains a liquid to be filtered when said piston is inserted into the container, said central passageway at the end portion of said sampling member having said lip being a cylindrical bore which is smaller in diameter than the diameter of the portion of said central passageway above said bore which collects filtered liquid, one end of said bore providing the opening through which a liquid to be filtered enters said filtering apparatus with the other end of said bore communicating with the portion of said central passageway which collects filtered liquid, and
   a porous filter member fitted within said bore to enable the filtration of a liquid as the liquid flows through said bore into the portion of the central passageway which collects filtered liquid.

2. The apparatus as set forth in claim 1 wherein said filter member has a plurality of interconnected voids, said interconnected voids defining a number of passageways in said filter member, said passageways communicating directly with the open ends of said bore.

3. The apparatus as set forth in claim 1 wherein said lip is formed on the bottom surface of said sampling member.

4. The apparatus as set forth in claim 3 wherein said bottom surface has a frusto-conical configuration.

5. The apparatus as set forth in claim 4 wherein said lip is a rounded rim on said bottom surface.

6. A pressure differential filtering apparatus for separating a liquid contained in an open mouth container comprising:
   an elongated sampling member defining a central passageway a portion of which collects filtered liquid, said central passageway being open at both ends and extending through the entire length of said sampling member;
   a piston member, having a cylindrical bore, mounted on one end of said sampling member, said bore being open at both ends, one end of said bore providing the opening through which a liquid to be separated enters the filtering apparatus with the other end of said bore communicating with the portion of said central passageway which collects filtered liquid, said bore being smaller in diameter than the diameter of the portion of said passageway above said bore which collects filtered liquid, said piston member having a resilient lip projecting outwardly from said sampling member, said lip being capable of forming a seal with the open mouth container when said piston member is inserted into the container, and
   a porous filter member fitted within said bore to enable the filtration of a liquid as the liquid flows through said bore into the portion of said central passageway which collects filtered liquid, said porous filter member having a plurality of interconnected voids, said interconnected voids defining a number of passageways in said filter member, said passageways communicating directly with the open ends of said bore.

7. The apparatus as set forth in claim 6 wherein said piston has a frusto-conical bottom surface and said lip is a rounded rim on said bottom surface.

8. A pressure differential filtering apparatus for separating a liquid comprising:
   a hollow cylindrical walled container having a closed bottom and an open top for containing a liquid to be filtered and separated;
   an elongated sampling member defining a central passageway a portion of which collects filtered liquid, said central passageway being open at both ends and extending through the entire length of said sampling member;
   a piston member, having a cylindrical bore, mounted on one end of said sampling member, said bore being open at both ends, one end of said bore providing the opening through which a liquid to be separated enters the filtering apparatus with the other end of said bore communicating with the portion of said central passageway which collects filtered liquid, said bore being smaller in diameter than the diameter of the portion of said passageway above said bore which collects filtered liquid, said piston member having a resilient lip projecting outwardly from said sampling member, said lip being capable of forming a seal with the walls of said container when said piston is inserted into said container, and
   a porous filter member fitted within said bore to enable the filtration of a liquid as the liquid flows through said bore into the portion of said central passageway which collects filtered liquid, said porous filter member having a plurality of interconnected voids, said interconnected voids defining a number of passageways in said filter, said passageways communicating directly with the open ends of said bore.

9. The apparatus as set forth in claim 8 wherein said lip of said piston member has a sufficient resiliency so that it may be urged sideways for compressing a portion of said lip against the inside wall surface of said cylindrical container and space the opposite portion of said lip from the opposite inside wall surface of said cylindrical container to form a gap so that said piston member can be moved axially within said container without creating appreciable pressure differential between the fluids on opposite sides of said lip.

* * * * *